United States Patent Office

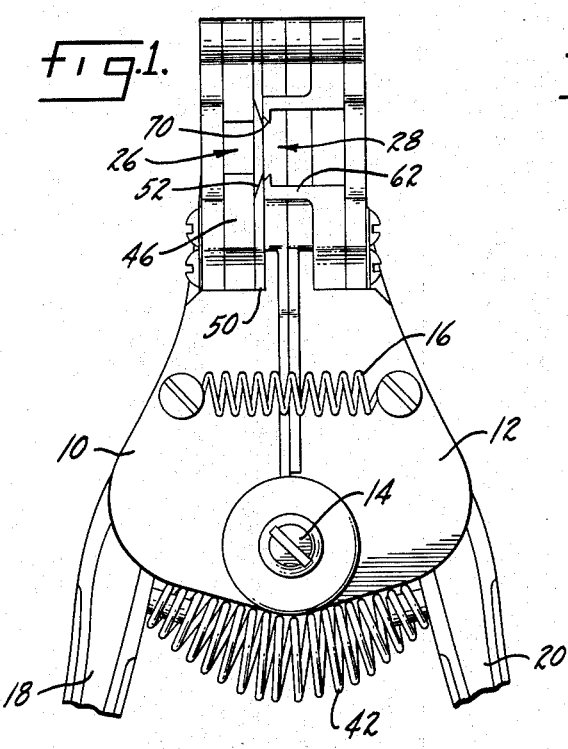
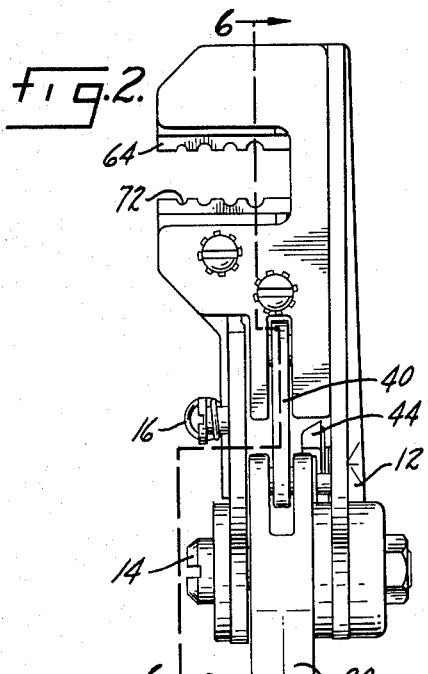
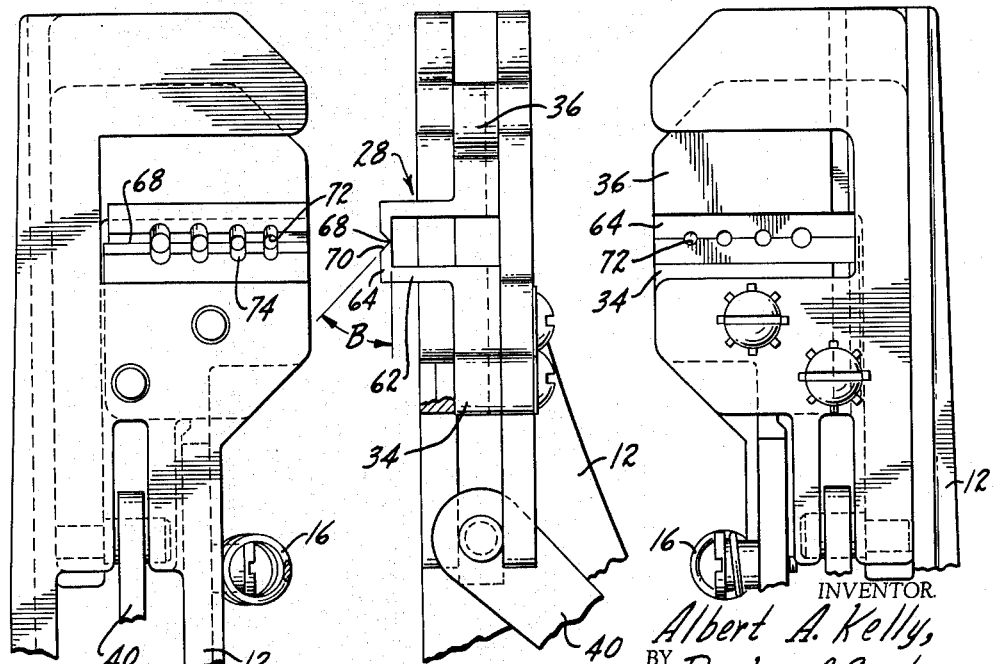
Jan. 4, 1966     A. A. KELLY     3,226,815
METHOD OF STRIPPING WIRE INSULATION
Filed April 20, 1962     2 Sheets-Sheet 1
INVENTOR.
Albert A. Kelly,
BY Parker & Carter
Attorneys.

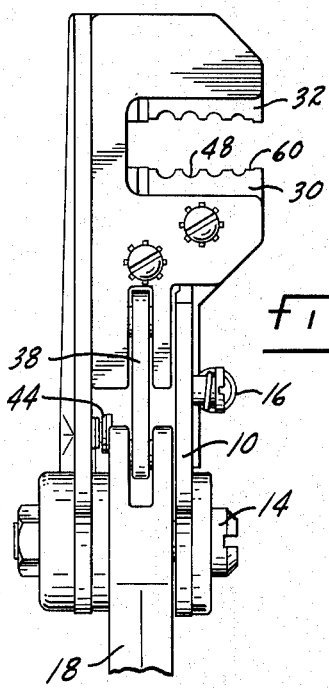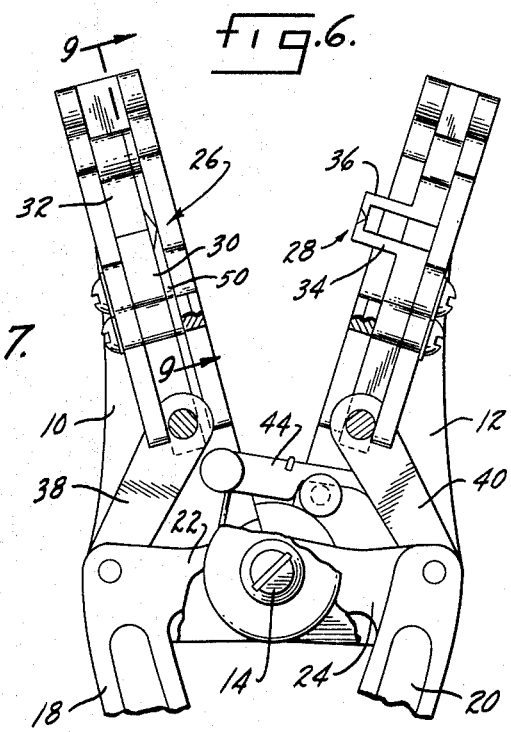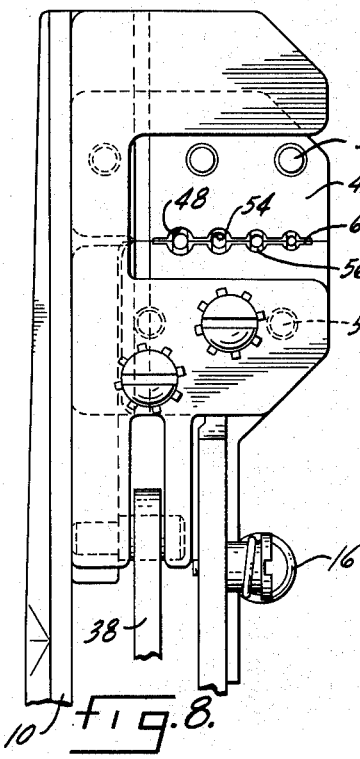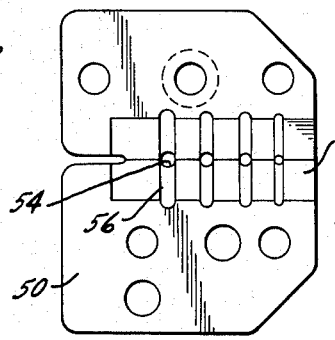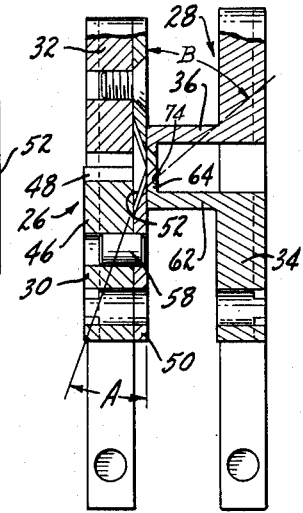

3,226,815
Patented Jan. 4, 1966

3,226,815
METHOD OF STRIPPING WIRE INSULATION
Albert A. Kelly, Sycamore, Ill., assignor to Ideal Industries, Inc., Sycamore, Ill., a corporation of Delaware
Filed Apr. 20, 1962, Ser. No. 189,176
2 Claims. (Cl. 29—427)

This invention relates to wire stripping, and particularly relates to a method for holding a covered wire, cutting the cover and removing the cover slug.

An object of this invention is a method of stripping wire in which the covered wire is cut by one element, and the cut wire slug is removed by another element.

Another object is a wire stripping method which holds a covered wire without damaging the held portion.

Another object is a wire stripping method which removes the cut cover slug without damaging the underlying wires.

Another object is a wire stripping method wherein a collet separately impinges and compresses the covered wire.

Another object is a wire stripping method in which the exposed wire is not contacted by any part of the stripper which could damage the wire.

Another object is a wire stripping method which has very thin and sharp cutting for penetrating through the cover of a wire.

Another object is a wire stripping method wherein cutting is relieved on the side away from the cut slug so that short cover slugs can be removed.

Another object is a wire stripping method which can remove short cover slugs.

Another object is a wire stripping method in which the separate gripper is relieved on the side adjoining the cutting blade.

Another object is a wire stripping method in which the stripping motion is performed separately by a gripper which bites into the slug but does not damage the underlying wire as the slug is removed.

Another object is a method of removing the insulation from an insulated metal conductor.

The foregoing objects are now attained along with other objects which will be apparent from time to time by the invention which will be described in detail and which is illustrated in the accompanying drawings wherein:

FIGURE 1 is a partial front view of the wire stripper;
FIGURE 2 is a side view of FIGURE 1;
FIGURE 3 is a front view, on an enlarged scale, of the gripping members;
FIGURE 4 is a side view of the left side of FIGURE 3;
FIGURE 5 is a side view of the right side of FIGURE 3;
FIGURE 6 is a view along line 6—6 of FIGURE 2, but with the jaws open;
FIGURE 7 is a side view of the left side of FIGURE 1.
FIGURE 8 is like FIGURE 7 with the jaws closed and on an enlarged scale;
FIGURE 9 is a side view of the cutting blades separately; and
FIGURE 10 is a front view partially in section of the cutting and holding element and the gripping element in the closed or active position.

Like numerals in the various views will refer to the same structure.

To begin with, this invention is in the nature of an improvement on the wire stripper shown and claimed in U.S. Patent No. 2,523,936, issued September 26, 1950, although it is not restricted to that specific type of wire stripper, but reference is made to that patent for the details of the basic structure.

Basically, the stripper may include a pair of levers 10 and 12 pivoted together at 14. A coil spring 16 may be positioned and connected to the levers to bias them to the closed position shown in FIGURE 1.

A pair of handles 18 and 20 with inwardly directed lugs 22 and 24 are also pivoted at 14 for manipulation. One of the levers carries clamping and cutting jaws, designated generally 26, while the other lever carries pulling or gripping jaws, designated generally 28. Each set of jaws includes both an upper and a lower jaw, each of which will be explained hereinafter. Considering the clamping and cutting jaws 26, the lower jaw 30 may be fixed while the upper jaw 32 may be movable to perform an opening and a closer action. The same is true of the gripping jaws 28, the lower jaw 34 may be fixed while the upper jaw 36 may be movable. The movable jaws may be actuated by links 38 and 40 which are connected to the handles. A coil spring 42 may be disposed between the levers to bias them apart. A latch mechanism 44 between the levers may be used for conventional purposes, as shown in U.S. Patent No. 2,523,936.

While I have shown the upper jaws as movable and coming down to the lower jaws which are stationary, it should be understood that it might be reversed, such as in U.S. Patent No. 2,179,581, issued November 14, 1939. Or both jaws may be movable toward a common central plane, such as shown in U.S. Patent No. 2,842,992, issued July 15, 1958.

The jaws themselves, and the function and operation they perform, are in a sense the unique part of this invention, and the details of the structure for manipulating them, be it a hand stripper, a bench stripper or otherwise, may be conventional and are not important.

Turning to the jaws specifically, I provide two sets of jaws, each set a pair, with the paired jaws operating in a new manner. The paired jaws at 26 on the left in FIGURE 1 both grip and cut the insulation. The paired jaws on the right at 28 in FIGURE 1 both grip and pull or strip the insulation.

The details of the gripping and cutting jaws 26 are shown in detail in FIGURE 10. Considering only the lower jaw 30 for the moment, it may be made up of a sandwich type structure of two portions, the first at 46 with a plurality of collet channels or slots 48, which may vary in size as shown in FIGURE 8, and the other 50 having a knife edge surface relieved on one side at 52 and a plurality of notches 54 which may vary in size, as shown in FIGURE 9 for various wire sizes. It will be noted that the relief 52 is next to the collet portion 46 so that the edge of the knife is away from rather than against the collet portion. Also, the relieved face is provided with channels 56 leading up to the wire notches 54. The two portions 46 and 50 are held together by suitable rivets 58 or the like so that they are permanently or semipermanently connected together, the advantage being that once two such precision portions are brought together, accurately aligned and positioned with the axis of each collet aligned with the axis of each notch 54, they may be riveted so that thereafter they function as an integral piece.

The upper gripping and cutting jaw 32 may be the same except reversed. Suitable guiding surfaces may be provided in the body of the lever 10 to insure accurate alignment and positioning when the jaws come together.

Thus, the jaws 26 define a plurality of collet openings or channels, each of which is aligned with a knife blade opening. I prefer that each of the collet openings 48 be somewhat undersized relative to the diameter of the insulation of the wire so that when the jaws are fully closed, the insulation will be compressed or squeezed somewhat. I provide cut-outs or reliefs 60 so that the compressed insulation may flow or bulge somewhat laterally. By providing undersize collets, I insure a tight or firm grip, but the collet openings are not sufficiently undersize so that damage will result on the insulation.

Each of the gripping jaws 34 and 36 may be roughly the same except symmetrically reversed, and I shall describe only the lower one. Basically, each such jaw includes an extension 62, to the left in FIGURE 10, with a ledge or shoulder 64 terminating in a cutting edge 68 relieved on one side at 70 and having a plurality of wire receiving openings 72 perhaps varying in size and spaced laterally along the upper edge with channels 74 on the bevel or relief 70 leading up to each such opening. It will be noted that the relief 70 is on the side toward the gripping and cutting jaws 26. Also, the extension 62 on the gripping jaws brings the knife edges over next to the cutting blades 50. I have shown them in direct contact, side by side, and it should be understood that I prefer them as close as possible.

The use, operation and function of my invention are as follows:

Basically, the invention is in the method and any suitable mechanism may be used for actuating the blades so that they perform an opening and closing action. These blades may be used in a hand type stripper, such as shown in the drawings, or they may be used as well in a bench type stripper.

Basically, I provide two sets of jaws, the first set, on the left in FIGURE 1, performing a gripping and cutting action, and the second set, on the right in FIGURE 1, performing a pulling action and only gripping, not necessarily cutting.

With the jaws fully open, as shown in FIGURE 1, a wire to be stripped may be suitably positioned between the jaws in one of the notches. Thereafter, the jaws are closed by any suitable mechanism and one of the collets 48 closes around the insulation and grips it tightly, squeezing somewhat with the excess bulging slightly into the reliefs on each side. An arrangement similar to this is shown in copending U.S. application Serial No. 95,658, filed March 14, 1961, now Patent No. 3,125,909. At the same time, the knives 50 cut through the insulation, and it should be noted that the angle of the relief 52 on the knives, designated A in FIGURE 10, is quite steep so that the knives come to a rather sharp point. I can do this since the knife edges themselves do not take any of the pull or force of removing the insulation. All gripping is done by the collets 48 and when the levers separate, the knives play no part in pulling the insulation off; they merely cut initially.

When the jaws first close, the gripping jaws 28, which are like teeth, also close and one of the openings 72 closes on that portion of the insulation to be stripped off, normally referred to as the slug. Note that the angle B of the gripping jaws is quite shallow or flat so that the edges will be thick and rugged. This is desirable since these jaws pull directly against the collets which hold the other end of the insulation. The openings 72 in the gripping jaws are sized so that they do not cut into the insulation an excessive distance. The basic object of these openings is to grip. They may and probably should cut in sufficiently deep to get a good grip. Be that as it may, as long as the gripping jaws take a firm grip on the slug, it is unimportant whether they actually do any cutting or not.

On the other hand, the cutting blades 50 should be highly precise and as sharp as possible. This means that the angle A should be less, instead of more, so that a clean cut will be acquired. Since the load of pulling the slug off is between the collets 48 and the biting jaws 68, the knives 50 should take very little if any thrust. Thus, I may make these at as steep an angle as I please consistent with the fact that, of course, they will have some but not much load.

The basic object is to remove insulation without nicking the conductor and without damaging the insulation in any way. The collets will not damage the insulation since they are dimensioned quite accurately and provide a squeeze fit without rupturing or damaging the insulation in any way.

One of the main advantages of the invention is that the knife type blades 50 may be made as thin and sharp as possible since no stripping force is applied to them. I emphasize this since this gives me complete freedom to make the cutting blades 50 as highly precise and sharp as possible to insure a clean sharp cut. Prior to this invention, these blades had to also take the stripping thrust, so that they have always had to be rather blunt, somewhat like the biting jaws 28 as shown by the angle B in FIGURE 10.

At no time is there a blade or knife edge moving over the bare conductor. Therefore, I eliminate all chances or possibility of the conductor being nicked. There is no chance of the gripping jaws 68 damaging the conductor since they do not cut all the way through the insulation and, in a sense, the remaining insulation acts as a cushion between those jaws and the conductor. I prefer that the cutting notches 54 on the knife edges be just slightly larger than the conductor diameter so that, at least in theory, a little insulation will be left around the conductor after the jaws are fully closed. But the remaining insulation is so small that it will easily separate when the jaws are separated to the position shown in FIGURE 6.

It should be noted that the sharp edge of the blades 50 is away from the collets. To state this another way, the cutting edges are toward the gripping jaws 68. It can thus be seen that the blades 50 will cut through the insulation directly next to the point where the slug is gripped. This allows the stripper to strip extremely short slugs, which has not been possible prior to this invention.

I show the relief 70 on the gripping jaws 68 on the side next to the cutting blades 50, but it should be understood that this may be reversed so that I will grip directly next to the point where the jaws 50 cut the insulation. This may be done with a very small increase in the required force to pull the slug off.

I claim:

1. A method of removing the insulation for a given length from the end of an insulated electric wire including the steps of applying smooth insulation gripping pressure to the insulation generally uniformly over a certain area thereof at a distance from the end of the wire slightly greater than the given length, applying insulation cutting pressure in relatively sharp edge contact to the insulation without contacting the metal conductor at the given length from the end of the wire to thus provide a separate slug of insulation still on the metal conductor, applying insulation gripping pressure to a certain area of the thus separate slug of insulation, and thereafter separating the two areas of applied insulation gripping pressure by a distance sufficient to substantially separate the separate insulation slug from the metal conductor by drawing the conductor through the area of insulation gripping pressure applied to the separate slug while holding the first area of applied insulation gripping pressure and the point of insulation cutting pressure substantially stationary relative to each other and to the insulated electric wire.

2. The method of claim 1 further characterized by and including the step of maintaining the insulation cutting pressure while the two areas of applied insulation gripping pressure are being separated without applying any substantial axial force to the insulation cutting pressure as a result of such separation.

References Cited by the Examiner

UNITED STATES PATENTS

| | | | |
|---|---|---|---|
| 1,386,328 | 10/1945 | Rollings | 30—179 X |
| 2,635,494 | 4/1953 | Rogoff. | |
| 2,842,016 | 7/1958 | Miller. | |
| 2,886,995 | 5/1959 | Bach et al. | 81—9.51 |
| 2,889,728 | 6/1959 | Hindenburg. | |
| 2,929,285 | 3/1960 | Gulemi | 81—9.51 |
| 3,125,909 | 3/1964 | Hindenburg. | |

FOREIGN PATENTS 619,302    9/1935    Germany.

WILLIAM FELDMAN, Primary Examiner.

MILTON S. MEHR, Examiner.